United States Patent Office 3,014,876
Patented Dec. 26, 1961

3,014,876
CALCIUM SILICATE PHOSPHORS
Richard W. Mooney, Towanda, Pa., assignor to Sylvania Electric Products Inc., a corporation of Delaware
No Drawing. Filed May 4, 1959, Ser. No. 810,526
5 Claims. (Cl. 252—301.4)

This invention relates to phosphors, and particularly to phosphors for excitation by utraviolet radiation. Such phosphors are particularly useful in fluorescent lamps of the low pressure or high pressure mercury vapor types.

I have found that calcium silicate can be activated by germanium, arsenic or antimony to produce a phosphor excitable by either the 2537 A. radiation present in the low pressure mercury lamp or by the higher wave-length ultraviolet radiation present in the high pressure mercury lamp, (often designated by the initials HPMV).

In order to produce a useful phosphor, the mixture ingredients used in making it should be fired in a reducing atmosphere, to insure that the activator is in a valence state lower than its maximum, except in the case of the metasilicate activated by antimony.

The most effective phosphors are obtained when the calcium silicate is of the beta ($\beta$) type, that is, a type produced by firing at high temperatures and having a different crystal structure and X-ray pattern than the gamma ($\gamma$) type produced at low temperatures.

When the phosphor is the orthosilicate ($Ca_2SiO_4$) the beta-type is produced at temperatures of about 2100° F. or more, but when the phosphor is the metasilicate ($CaSiO_3$) the beta-type can be produced at temperatures of about 1800° F. or more. The metasilicate, however, is effective only with antimony as an activator. The orthosilicate with either germanium, arsenic or antimony as an activator fluoresces in the blue, with a peak emission at 452 millimicrons; but the metasilicate with antimony activation fluoresces in the yellow, with a peak at about 544 millimicrons.

The orthosilicates respond to both 2537 A. and HPMV excitation, except in the case of antimony, which responds only to the 2537 A. excitation. However, antimony-activated metasilicate responds to both.

In making a phosphor according to the invention, calcium carbonate and silicic acid can be weighed out in amounts corresponding to the desired mol ratio, i.e., 1.00 $CaCO_3$ to 1.00–1.50 $SiO_2$ for the calcium metasilicate and 2.00 $CaCO_3$ to 1.00–1.50 $SiO_2$ for the calcium orthosilicate—the exact ratio depending upon the activator concentration. Other calcium compounds can also be used, such as calcium oxalate or calcium dihydrogen orthosilicate ($CaH_2SiO_4$), in which case, the amount of silica would have to be reduced to compensate for that contained in $CaH_2SiO_4$. The mixture of a calcium salt, silicic acid and a salt of the activator is mixed by pebble milling in deionized water for approximately 2 hrs., followed by filtering and drying. The dry filter cake is broken up by some simple means such as rolling, ball-milling, or hammermilling, and if desired, mixed with a flux such as $NH_4Cl$ prior to firing. The mix is placed in boats or crucibles and fired in a controlled atmosphere at temperatures ranging from 1700° F. to 2300° F., depending upon the particular crystal structure desired. The ingredients may be fired in an atmosphere of steam or in an atmosphere of steam and a reducing gas such as hydrogen, carbon monoxide, water gas, etc., depending upon the particular activator used and whether it produced fluorescence in its higher or lower valence state. Nitrogen is usually added to the reducing gas mixture in order to reduce the partial pressure of the reducing gas, thus avoiding overreduction of the activator to the metallic state. When hydrogen is used, the percent of hydrogen in the hydrogen-nitrogen gas mixture may range anywhere from 1–100%, although best results are obtained in the range of 50–100%. The fired mixture is cooled to room temperature in an inert nitrogen atmosphere. In the cases where a reducing gas atmosphere is required, a double firing procedure, i.e., first fired in steam followed by a second firing in a more strongly reducing gas, may also be used.

The phosphors which are produced by this method are described below, together with additional information on the activator used temperature, etc.

1.—*Germanium-activated $\beta$-calcium orthosilicate*: The use of germanium as an activator gives rise to fluorescent emission at a wavelength of 452 mu under 2537 A. or HPMV excitation. The germanium may be introduced as $GeO_2$ or any other suitable germanium compound. The concentration of germanium may vary widely with good results being obtained at 5% Ge. Fluorescence is produced only when the phosphor is fired in a strongly reducing atmosphere, thus indicating that the germanium is in a reduced state, probably $Ge^{2+}$. The maximum brightness is produced by firing at a temperature ranging from 2100 to 2250° F. to produced the $\beta$-$Ca_2SiO_4$ structure.

2.—*Arsenic-activated $\beta$-calcium orthosilicate*: Arsenic in the trivalent state also produces a deep blue phosphor under 2537 A. or HPMV excitation. Again, the emission band occurs at 452 mu corresponding to the $As^{3\pm}$ activated $\beta$-$Ca_2SiO_4$. The As may be introduced as $As_2O_3$ or the corresponding acid in widely varying amounts with good results being obtained at 5% As. In order to obtain fluorescence, the phosphor must be fired in a reducing gas mixture consisting of steam, hydrogen and nitrogen, thus indicating that the arsenic is in the 3+ oxidation state rather than the 5+ oxidation state. Further corroborating evidence of this may be seen from the fact that $As^{3+}$ has the same electronic structure as $Ge^{2+}$. Optimum brightness is obtained at firing temperatures ranging from 2100 to 2250° F., although in the case of arsenic, even higher temperatures may be used and still maintain relatively high fluorescence efficiency.

3.—*Antimony-activated $\beta$-calcium metasilicate and antimony-activated $\beta$-calcium orthosilicate*: Antimony-activated calcium silicates are also useful. In all cases, antimony may be introduced as $Sb_2O_3$ or $Sb_2O_5$ in widely varying amounts with good results at 5% Sb.

Sb-activated $\beta$-$Ca_2SiO_4$ is similar to $Ge^{2\pm}$, and $As^{3+}$-activated $\beta$-$Ca_2SiO_4$ emitting in the blue at about 452 mu under 2537 A. excitation, but does not emit under HPMV excitation. As with the others discussed above, a strongly reducing atmosphere is required to produce a phosphor indicating that the Sb is in the 3+ oxidation state. Best results are obtained at firing temperatures between 2100 and 2250° F. giving the $\beta$-$Ca_2SiO_4$ structure.

Sb-activated $\beta$-$CaSiO_3$ is also fluorescent under HPMV excitation, emitting at about 544 mu (yellow). In this case, optimum fluorescence is obtained in the absence of hydrogen, i.e., the phosphor mix is fired in an atmosphere of steam only. Optimum brightnesses are obtained at firing temperatures ranging from 1800 to 2000° F. corresponding to the formation of $\beta$-$CaSiO_3$.

Specific examples of the preparation of these phosphors are given below.

*Example I*

The following materials were weighed out into a two-gallon pebble mill.

|  | Mole Ratio | Weight, g. |
|---|---|---|
| $CaCO_3$ | 2.00 | 600.6 |
| $SiO_2.xH_2O$ (90.2% $SiO_2$) | 1.10 | 235.4 |
| $GeO_2$ | 0.05 | 15.6 |

Fifteen hundred (1500) mls. of deionized water were added and the mixture was rolled for 2 hours. At the end of the this period, the slurry was filtered on a Buchner funnel and oven dried at 110° C. for 16 hours. The cooled cake was rolled out and fired 2 hours at 2200° F. in an atmosphere of steam (20 lbs. pressure and a steam valve setting of 0.2), 10 liters per minute of hydrogen, and 10 liters per minute of nitrogen. The resulting phosphor was cooled to room temperature in nitrogen.

*Example II*

The following materials were weighed out into a two-gallon pebble mill.

|  | Mole Ratio | Weight, g. |
|---|---|---|
| $CaCO_3$ | 2.00 | 600.6 |
| $SiO_2.xH_2O$ (90.2% $SiO_2$) | 1.20 | 239.7 |
| $As_2O_3$ | 0.025 | 14.9 |

Fifteen hundred (1500) mls. of deionized water were added and the mixture rolled for 2 hours. At the end of this period, the mixture was filtered on a Buchner funnel and oven dried at 110° C. for 16 hours. The cooled cake was rolled out and fired for 2 hours at 2100° F. in an atmosphere of steam (20 lbs. pressure and steam valve setting of 0.1), 10 liters per minute of hydrogen and 10 liters per minute of nitrogen. The resulting phosphor was cooled in nitrogen.

*Example III*

The following materials were weighed out into a two-gallon pebble mill.

|  | Mole Ratio | Weight, g. |
|---|---|---|
| $CaCO_3$ | 2.00 | 600.6 |
| $SiO_2.xH_2O$ (90.2% $SiO_2$) | 1.20 | 239.7 |
| $Sb_2O_3$ | 0.025 | 21.9 |

Fifteen hundred (1500) mls. of deionized water were added and the mixture was rolled for 2 hours. At the end of this period, the slurry was filtered on a Buchner funnel and oven dried at 110° C. for 16 hours. The cooled cake was rolled out and fired 2 hours at 2100° F. in an atmosphere of steam (20 lbs. pressure at a steam valve setting of 0.1), 10 liters per minute of hydrogen and 10 liters per minute of nitrogen. The resulting phosphor was cooled to room temperature in nitrogen.

*Example IV*

The following materials were weighed out into a two-gallon pebble mill.

|  | Mole Ratio | Weight, g. |
|---|---|---|
| $CaCO_3$ | 1.00 | 300.0 |
| $SiO_2.xH_2O$ (90.2% $SiO_2$) | 1.20 | 239.7 |
| $Sb_2O_3$ | 0.025 | 21.9 |

Fifteen hundred (1500) mls. of deionized water were added and the mixture was rolled for 2 hours. At the end of this period, the slurry was filtered on a Buchner funnel and oven dried at 110° C. for 16 hours. The cooled cake was rolled out and fired for 3 hours at 1900° F. in an atmosphere of steam (20 lbs. pressure at a steam valve setting of 0.1).

What I claim is:

1. A phosphor having the beta calcium orthosilicate structure activated by a substance selected from the group consisting of germanium, antimony and arsenic, in a state of valence lower than its maximum.

2. A phosphor having the beta calcium orthosilicate crystal structure activated by germanium in a valence state lower than its maximum.

3. A phosphor having the beta calcium orthosilicate crystal structure activated by arsenic in a valence state lower than its maximum.

4. A phosphor having the beta calcium orthosilicate crystal structure activated by antimony in a valence state lower than its maximum.

5. A phosphor having the beta calcium metasilicate structure activated by antimony.

References Cited in the file of this patent

UNITED STATES PATENTS 2,457,054    Leverenz            Dec. 21, 1948

FOREIGN PATENTS 572,771    Great Britain          Oct. 23, 1945